United States Patent [19]
Hrubesch

[11] Patent Number: 5,002,168
[45] Date of Patent: Mar. 26, 1991

[54] FRICTION CLUTCH ASSSEMBLY

[75] Inventor: Klaus Hrubesch, Lauf, Fed. Rep. of Germany

[73] Assignee: Luk Lamellen Und Kupplungsbau GmbH, Bühl, Fed. Rep. of Germany

[21] Appl. No.: 356,335

[22] Filed: May 23, 1989

[30] Foreign Application Priority Data

May 24, 1988 [DE] Fed. Rep. of Germany ....... 3817522
Jun. 3, 1988 [DE] Fed. Rep. of Germany ....... 3818836

[51] Int. Cl.[5] .............................................. F16D 13/60
[52] U.S. Cl. ................................ 192/70.27; 192/89 B
[58] Field of Search ............... 192/30 R, 70.13, 70.27, 192/89 B, 110 S, 115, DIG. 1

[56] References Cited

U.S. PATENT DOCUMENTS

| 2,067,442 | 1/1937 | Frisz | 192/30 R X |
| 4,238,018 | 12/1980 | Maucher | 192/89 B X |
| 4,883,153 | 11/1989 | Maucher et al. | 192/70.27 |

Primary Examiner—Richard Lorence
Attorney, Agent, or Firm—Peter K. Kontler

[57] ABSTRACT

The clutch and clutch plate of a friction clutch for use in the power trains of motor vehicles are mounted on a mandrel which maintains them in fixed axial positions during transport, storage and delivery to a production line where the kit including the mandrel, the clutch and the clutch plate is secured to the flywheel on the output shaft of the engine in a motor vehicle. At such time, a cylindrical front section of the mandrel extends into an axial recess of the output shaft. The mandrel is then withdrawn from the recess, clutch plate and clutch. Detent elements on the mandrel and clutch plate releasably hold the clutch plate against accidental movement toward the cylindrical section. A portion of the mandrel is designed to center the clutch, and a further section of the mandrel serves to prevent the clutch from moving axially and away from the clutch plate while the clutch plate is held by the detent elements.

36 Claims, 3 Drawing Sheets

FRICTION CLUTCH ASSSEMBLY

BACKGROUND OF THE INVENTION

The invention relates to clutches in general, and more particularly to improvements in clutch assemblies, especially friction clutch assemblies, which can be used with advantage in power trains of motor vehicles. Still more particularly, the invention relates to improvements in friction clutch assemblies of the type wherein a clutch plate (which can be used to transmit torque to the input element of a variable-speed transmission in a motor vehicle) is disposed and can be clamped between two pressure plates one of which forms part of the clutch proper and the other of which is a torque transmitting component, such as a flywheel on the output element of the engine in a motor vehicle.

A clutch assembly of the above outlined character normally comprises means (particularly a diaphragm spring) for biasing one of the pressure plates axially toward the other pressure plate so that the clutch plate is clamped between the pressure plates and transmits torque to the input element of the transmission when the other pressure plate is driven by an engine or in another way. Prior to being installed in a motor vehicle, the clutch plates and the clutches of such clutch assemblies are packed independently of each other and are delivered to the production line in a vehicle assembling plant along separate paths, particularly on separate pallets. The clutch plates and the clutches proper are thereupon removed from the respective pallets and are prepared for assembly on the other clutch plate, such as the friction wheel on the crankshaft of an internal combustion engine. All this involves much time and the utilization of a large number of pallets. Moreover, the unwrapping of several discrete packages which contain clutch plates and clutches proper is a time-consuming operation and can constitute a bottleneck in the corresponding section of the production line.

OBJECTS OF THE INVENTION

An object of the invention is to provide a clutch assembly which can be installed in a motor vehicle or elsewhere with substantial savings in time.

Another object of the invention is to provide a clutch assembly which takes up less space than a conventional clutch assembly, not only in storage but also during delivery to a vehicle assembling plant or another establishment wherein the clutch assembly is installed in or otherwise combined with devices which employ or embody friction clutches.

A further object of the invention is to provide a novel and improved kit which can be used to facilitate installation of friction clutches in the power trains of motor vehicles.

An additional object of the invention is to reduce the number of pallets or other types of supports for clutch assemblies in vehicle assembling or like plants.

Still another object of the invention is to provide a novel and improved tool or implement which can be used in or with the above outlined clutch assembly.

A further object of the invention is to provide a novel and improved method of storing parts of friction clutches and of transporting such parts to the locale of use.

An additional object of the invention is to provide a novel and improved method of affixing a clutch and a clutch plate to a torque transmitting component in the power train of a motor vehicle.

Another object of the invention is to provide a novel and improved method of temporarily coupling the clutch and the clutch plate of a friction clutch assembly to each other for the purposes of storage and/or transport to the locus of use.

An additional object of the invention is to provide a method which reduces the likelihood of assembling clutches with wrong clutch plates in a vehicle assembling plant.

Another object of the invention is to provide a friction clutch assembly whose space requirements in storage and during transport are a fraction of the space requirements of conventional packed and stored friction clutch assemblies.

A further object of the invention is to provide a novel and improved method of preventing attachment of clutch plates to wrong clutches during assembly of friction clutches in the power trains of motor vehicles.

Still another object of the invention is to provide a compact friction clutch assembly which can be installed by robots and which can be installed within a fraction of the time required for assembly of heretofore known friction clutch assemblies wherein the clutch plates and the corresponding clutches are delivered to an assembly line along separate paths and on separate pallets.

SUMMARY OF THE INVENTION

One feature of the present invention resides in the provision of a kit, particularly for attachment to a rotary torque transmitting component which is driven by the output element of an engine in a motor vehicle and wherein the output element has an axial recess or socket (e.g., for the pilot bearing which receives one end of the input shaft of a variable-speed transmission). The improved kit comprises a clutch including a rotary cover connectable to the rotary component, a rotary pressure plate which is adjacent the cover and is disposed between the cover and the rotary component when the cover is connected to the rotary component, and means (such as a diaphragm spring) for biasing the pressure plate axially and away from the cover. The kit further comprises an annular clutch plate (the pressure plate is normally disposed between the clutch plate and the cover), and means for temporarily securing the clutch to the clutch plate. The securing means comprises an implement (hereinafter called mandrel for short) having a first section in the annular clutch plate and a second section which is coaxial with the first section and extends beyond the clutch plate in a direction away from the pressure plate to be received in the recess of the output element of the engine, and the securing means further comprises means for separably coupling the mandrel to the clutch and to the clutch plate.

The torque transmitting component can include or constitute a flywheel and the aforementioned diaphragm spring (biasing means) is preferably installed in such a way that it reacts against the cover of the clutch and bears against the pressure plate so as to urge the clutch plate against the rotary torque transmitting component when the latter is connected with the cover.

The clutch plate preferably comprises a hub which surrounds the first section of the mandrel substantially without radial play. The hub can be provided with an internal gear which can mate with an external gear on the input shaft of the variable-speed transmission and closely surrounds the first section of the mandrel.

The first and second sections of the mandrel can include or constitute hollow cylinders having cylindrical peripheral surfaces. The diameter of the peripheral surface of the second section is preferably smaller than the diameter of the peripheral surface of the first section of the mandrel.

The mandrel preferably further comprises a third section which can be said to form part of the coupling means and engages the clutch. The first section is preferably disposed between the second and third sections of the mandrel. The third section (which is or can be dished) preferably extends radially outwardly beyond the first section to overlap a portion of the clutch. The diaphragm spring preferably comprises a set of elastic prongs which extend radially inwardly toward the common axis of the clutch and clutch plate and define a centrally located opening for the mandrel. The aforementioned portion of the clutch includes the radially innermost portions of the prongs.

The coupling means can include means for yieldably holding the clutch plate and the clutch in predetermined axial positions relative to each other. At least a portion of the holding means can be disposed in the region of the first section of the mandrel, and at least a portion of the holding means is or can be resilient. In accordance with a presently preferred embodiment, the holding means includes means for automatically holding the clutch and the clutch plate in their predetermined positions as soon as the clutch and the clutch plate assume, and as long as the clutch and the clutch plate remain in, their predetermined positions.

The holding means can include detent means which is operative to permit separation of the clutch plate from the mandrel in response to a pull upon the clutch plate and/or upon the mandrel in a direction to move the clutch and the clutch plate axially and away from each other. The holding means can include at least one first holding or detent element on the mandrel, particularly on the first section of the mandrel, and at least one second holding or detent element on the hub of the clutch plate. The first holding or detent element can be made (at least in part) of a resilient material. The first and second detent elements can be provided with complementary profiles which are adjacent each other in the predetermined axial positions of the clutch and clutch plate relative to each other. The first detent element (on the mandrel) can be provided with a protuberance which extends radially of the mandrel and carries the corresponding profile. The clutch plate of the improved kit is disposed between the protuberance of the first detent element and the clutch, and the second detent element is preferably provided on the hub of the clutch plate at that side of the clutch plate which faces away from the clutch and toward the second section of the mandrel. The second detent element can be integral with the clutch plate, and the first clutch element can form an integral part of the mandrel. The first detent element can be provided with a cam face (e.g., with a chamfer at its free end) which facilitates introduction of the mandrel into the annular clutch plate.

In lieu of one or more resilient prong- or finger-like first detent elements, the detent means of the holding means can include a radially deformable ring in a peripheral groove of the mandrel, e.g., in the first section of the mandrel. Such ring can include a resilient split ring or an O-ring or a like ring made of an elastomeric material.

The mandrel preferably further comprises means for centering the clutch, and such centering means can serve as, or can form part of, a means for connecting the first and third sections of the mandrel. The centering means is preferably surrounded by a portion of the clutch, preferably by the radially innermost portions of elastic prongs of the diaphragm spring. To this end, the centering means can be received in the central opening which is defined by the prongs of the diaphragm spring. The third section of the mandrel preferably extends radially outwardly beyond the connecting and centering means of the mandrel and abuts the prongs of the diaphragm spring in engaged condition of the clutch.

The connecting means of the mandrel can resemble or constitute a hollow conical frustum or funnel which tapers toward the axis of the mandrel in a direction from the third toward the first section. Such connecting means (including the centering means) is normally disposed between the first and third sections of the mandrel, and the first section is preferably disposed between the connecting means and the second section of the mandrel. The centering means of the connecting means can be immediately adjacent the third section of the mandrel.

The mandrel is preferably hollow and is preferably designed in such a way that it can receive a portion of a mandrel forming part of a second kit. This renders it possible to stack two, three or more kits in coaxial positions by the simple expedient of inserting a portion of the mandrel forming part of one kit into the interior of the mandrel forming part of another kit.

The mandrel can consist of a single piece of metallic or plastic material, i.e., the first, second and third sections of the mandrel can be integral with each other and with the connecting portion.

Another feature of the present invention resides in the provision of a friction clutch assembly, particularly for use in motor vehicles. The improved friction clutch assembly comprises coaxial first and second rotary pressure plates (the second pressure plate can constitute the aforementioned rotary torque transmitting component, such as a flywheel which is to be affixed to the output element of the engine in a motor vehicle), an annular clutch plate between the pressure plates, means for yieldably biasing one of the pressure plates (such as the first pressure plate) axially toward the other pressure plate so as to clamp the clutch plate between the pressure plates, fastener means (e.g., a set of bolts) which can be (preferably indirectly) applied to the pressure plates in order to transmit torque between the pressure plates, and means for temporarily securing the first pressure plate to the clutch plate preparatory to the application of fastener means. The means for temporarily securing includes a mandrel having a (first) section which is surrounded by the clutch plate, and means for separably coupling the clutch plate and the first pressure plate to the mandrel so that the clutch plate and the first pressure plate are at least substantially coaxial with each other and are preferably maintained in predetermined axial positions relative to one another.

Such friction clutch assembly preferably further comprises means for attaching the second pressure plate to the output element of an engine in a motor vehicle. The attaching means can include a set of bolts which can be used to affix the second pressure plate to a crankshaft which is driven by the engine of a motor vehicle. If the output element of the engine has an axial recess or socket for a pilot bearing which surrounds a portion of the input shaft of a variable-speed transmission in the power train of the motor vehicle, the mandrel further comprises the aforementioned second section which is coaxial with the first section and is receivable in the recess during attachment of the first pressure plate to the second pressure plate.

An additional feature of the invention resides in the provision of a method of mounting an annular clutch plate and a clutch on a rotary torque transmitting component, particularly on a flywheel which is mounted on an output element driven by the engine of a motor vehicle and having an axial recess or socket for a pilot bearing or the like. The method comprises the steps of (a) assembling the clutch plate and the clutch with a mandrel into a kit wherein the clutch and the clutch plate are coaxial with the mandrel and the mandrel has a first section surrounded by the clutch plate, a second section receivable in the recess of the output element, and devices for separably coupling the mandrel to the clutch and to the clutch plate, (b) inserting the second section of the mandrel into the recess, (c) fastening the clutch to the torque transmitting component, and (d) uncoupling the mandrel from the clutch plate and from the clutch. This last step includes extracting the second section of the mandrel from the recess.

The assembling step preferably comprises positioning the clutch plate adjacent the clutch and introducing the second section of the mandrel through and beyond the clutch and thereupon through and beyond the clutch plate so that the second section is exposed for insertion into the recess of the output element. The assembling step preferably further includes maintaining the clutch plate and the clutch in positions of coaxiality and in predetermined axial positions relative to each other.

The novel features which are considered as characteristic of the invention are set forth in particular in the appended claims. The improved kit and friction clutch assembly themselves, however, both as to their construction and the mode of installing the same, together with additional features and advantages thereof, will be best understood upon perusal of the following detailed description of certain presently preferred specific embodiments with reference to the accompanying drawing.

DESCRIPTION OF PREFERRED EMBODIMENTS

Figure 1:
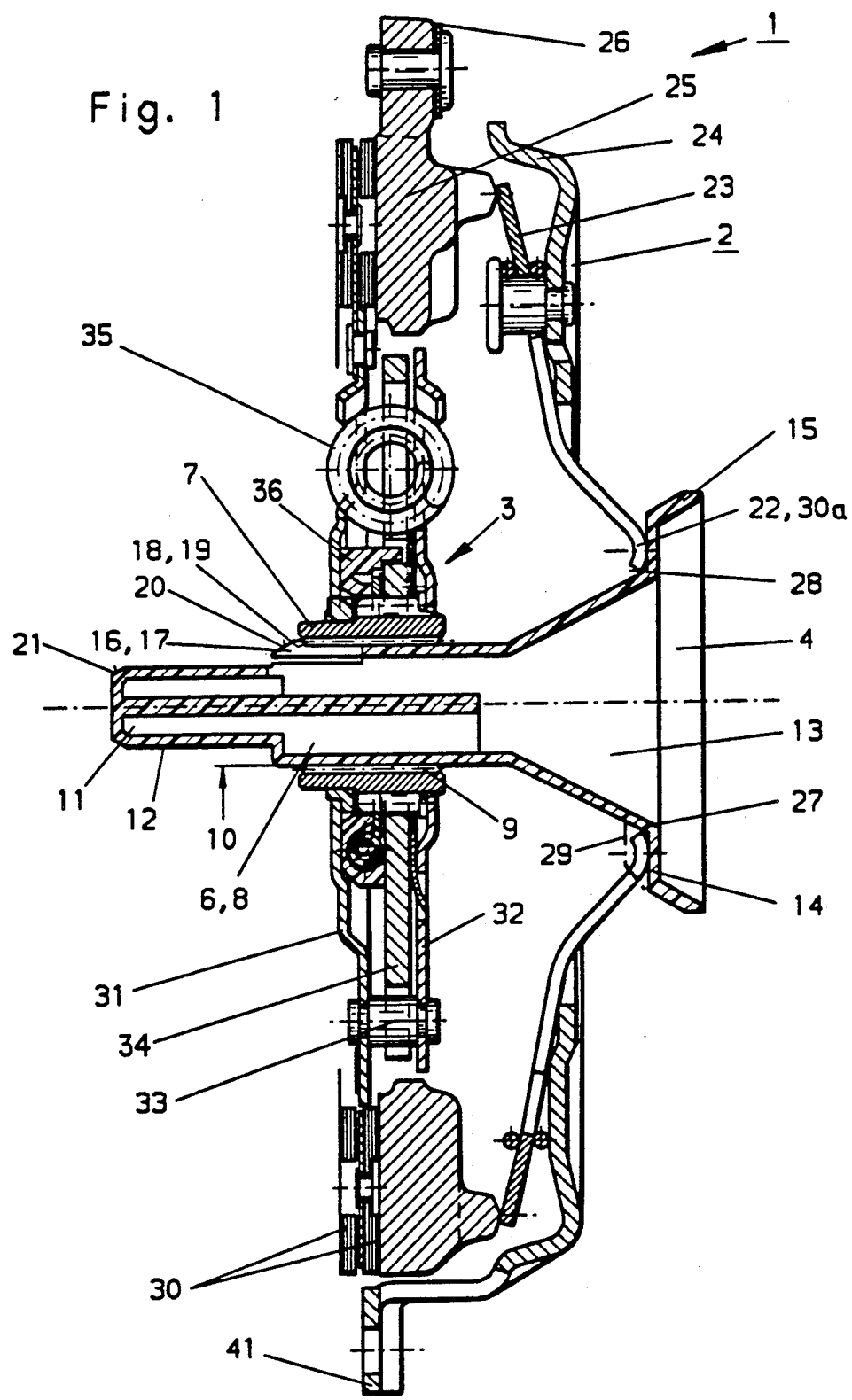
FIG. 1 is an axial sectional view of a kit which is constructed and assembled in accordance with the present invention, with the clutch and clutch plate mounted on the mandrel in predetermined axial positions re to each other.

FIG. 1 shows a kit 1 which comprises an annular clutch 2, an annular clutch plate or clutch disc 3 and a one-piece implement 4 (hereinafter called mandrel) which is coaxial with and extends through the clutch 2 and clutch plate 3. The mandrel 4 serves to maintain the clutch and the clutch plate in predetermined axial positions relative to each other during storage, during transport to an assembly plant, and preferably also during advancement in the assembly plant toward the locus of indirect attachment of the axially movable pressure plate 25 of the clutch 2 to a second pressure plate, such as a rotary torque transmitting component or flywheel 5 (FIG. 2) on the output element or component 38 or the engine in a motor vehicle.

The mandrel 4 comprises a cylindrical first section 6 which is coaxially surrounded by the clutch plate 3, a second section 11 which is receivable in an axial recess or socket 37a of the output element 38 of the engine during indirect attachment of pressure plate 25 to the flywheel 5, a third section 14 which is outwardly adjacent the clutch 2, and a connecting portion 13 which serves to center the clutch 2 and integrally connects the sections 6 and 14 to each other. The section 11 is integral with the section 6, and the diameter of its cylindrical peripheral surface 12 is smaller than the diameter of the cylindrical peripheral surface 10 of the section 6.

The clutch plate 3 has a centrally located hub 7 with an axial passage 8 which is surrounded by an internal gear 9 mating with the external gear of the input element of a variable-speed transmission (not shown) when the friction clutch assembly including the clutch plate 3 and clutch 2 is properly installed in the power train of a motor vehicle. The internal gear 9 of the hub 7 surrounds the cylindrical peripheral surface 10 of the section 6 with minimal radial play, i.e., the diameter of the addendum circle of the gear 9 matches or only slightly exceeds the diameter of the peripheral surface 10. The clutch plate 3 of the properly assembled kit 1 is located between the clutch 2 and the section 11, as seen in the axial direction of the mandrel 4, and the connecting portion 13 is disposed between the sections 11 and 14. The section 14 is dished and includes a washer-like portion integral with the larger-diameter end of the hollow frustoconical or funnel-shaped connecting portion 13 and a relatively short hollow frustoconical rim 15 which flares radially outwardly in a direction away from the clutch 2. The rim 15 serves as a means for stiffening the hollow mandrel 4 and as a handle which facilitates manipulation. In accordance with a presently preferred embodiment, the mandrel 4 is made in an injection molding or like machine from a fiber-reinforced plastic material.

The mandrel 4 forms part of a means for temporarily securing the clutch 2 to the clutch plate 3, and such securing means further comprises means for separably coupling the mandrel to the clutch 2 and clutch plate 3. The coupling means includes the aforediscussed radially outwardly extending portion of the third section 14 of the mandrel 4 as well as means (including detent elements 16 and 19 on the section 6 and the hub 7, respectively) for yieldably holding the clutch plate 3 and the clutch 2 against axial movement relative to each other. Such detent elements cooperate with each other and with the section 14 to ensure that a portion of the clutch 2 abuts and is overlapped by the section 14 and that the clutch plate 3 is held against accidental axial movement away from the section 14 onto and beyond the section 11.

The detent elements 16 are axially parallel resilient tongues or prongs which are integral with the section 6 adjacent the section 11 and form an annulus partly within the confines of the hub 7. The free end portion of each tongue 16 has a radially outwardly extending protuberance 17 with a suitably inclined profile 18 adjacent a complementary profile on the left-hand end portion 19 (detent element) of the hub 7. Each protuberance 17 is further provided with a cam face 20 which facilitates insertion of the section 6 into the passage 8 of the hub 7. The tongues 16 are preferably equidistant from each other in the circumferential direction of the mandrel 4, and their protuberances 17 yield radially inwardly during insertion of the section 6 into the clutch plate 3. At such time, the cams 20 of the protuberances 17 strike against the right-hand end face of the hub 7 and are caused to move radially inwardly to thereupon move radially outwardly as soon as they advance beyond the complementary profile of the left-hand end portion (detent element) 19 of the hub. The profiles 18, cooperate with the profile of the end portion 19 and with the section 14 to automatically hold the clutch plate 3 in the axial position of FIG. 1 as soon as the mandrel 4 is properly inserted into the clutch 2 and clutch plate 3. A certain pull is required to draw the clutch plate 3 in a direction to the left (i.e., away from the clutch 2) and/or to draw the mandrel 4 in a direction to the right (while the clutch plate 3 is held against axial movement with the mandrel) in order to enable the hub 7 to depress the protuberances 17 of the tongues 16 and to thereupon permit extraction of the mandrel from the clutch plate.

The resiliency of the tongues 16 suffices to prevent accidental extraction of the mandrel 4 from the clutch plate 3. In other words, the detent means including the tongues 16 and the adjacent end portion 19 of the hub 7 establishes a separably form-locking connection between the mandrel 4 on the one hand and the cutch 2 and clutch plate 3 on the other hand, and such connection remains intact until and unless it is intentionally terminated by forcibly extracting the mandrel from the parts 2 and 3. The profiles 18 jointly form a composite frustoconical surface which is adjacent the complementary frustoconical profile of the end portion 19 of the hub 7 in assembled condition of the kit 1. The cams 20 jointly constitute a second composite frustoconical profile whose taper is counter to that of the composite profile 18 and which serves to facilitate insertion of the protuberances 17 into the passage 8 of the hub 7. The profiles 18 taper toward the axis of the mandrel 4 in a direction toward the section 14, and the cams 20 slope toward the axis of the mandrel in a direction toward the section 11. A diaphragm spring 23 of the clutch 2 can serve as a means for urging the hub 7 axially against the profiles 18 with a force which prevents axial shifting of the clutch 2 and/or clutch plate 3 relative to the mandrel 4 but is too weak to move the protuberances 17 radially inwardly so that the clutch plate could slide onto the section 11 of the mandrel.

Figure 2:
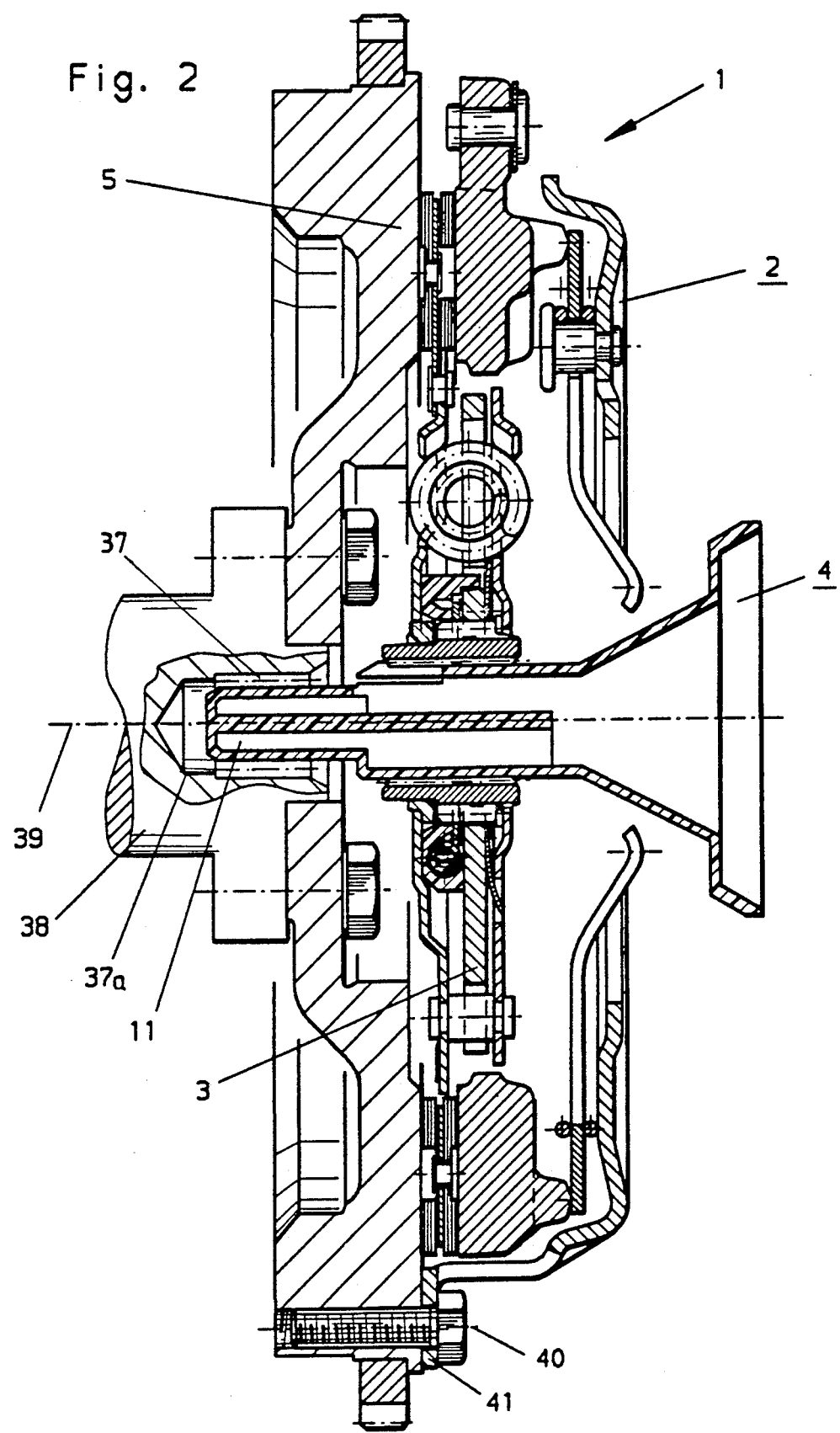
FIG. 2 is an axial sectional view of the improved friction clutch assembly with one of the clutch plates bolted to the output element of the engine in a motor vehicle and with the second section of the mandrel extending into an axial recess of the output element.

The free end of the section 11 is also provided with a frustoconical cam 21 which facilitates introduction of the section 11 into the recess 37a of the output element 38 of FIG. 2.

The clutch 2 comprises the aforementioned diaphragm spring 23 which reacts against a cover 24 and normally bears against the axially movable pressure plate 25. The latter is axially movably connected to the cover 24 by a set of leaf springs 26 (only one shown in FIG. 1), and the marginal portion 41 of the cover 24 can be affixed to the torque transmitting component (flywheel) 5 by bolts 40 (FIG. 2) or analogous fasteners. When the cover 24 is affixed to the component 5 and the clutch 2 is engaged, the radially outermost main portion of the diaphragm spring 23 causes the pressure plate 25 to cooperate with the component 5 by clamping the clutch plate 3 between the parts 5 and 25 in order to ensure that the clutch plate can drive the input element of the transmission when the engine is on, i.e., when the output element 38 (e.g., a crankshaft) of the engine rotates the component 5 which, in turn, rotates the cover 24 and hence the pressure plate 25.

The illustrated diaphragm spring 23 has a set of radially inwardly extending elastic prongs 22 which define a central opening 28 and have tips abutting the section 14 of the mandrel 4 in assembled condition of the kit 1. The tips of the prongs 22 are engaged by a customary bearing (not shown) which moves the tips toward the clutch plate 3 in order to disengage the friction clutch, i.e., to permit the pressure plate 25 to rotate relative to the clutch plate. The diaphragm spring 23 is tiltably mounted at the inner side of the cover 24 in a conventional manner (e.g., between two ring-shaped seats), and the clutch 2 is disengaged when the radially innermost portions of the prongs 22 are moved axially of the clutch 2 toward the clutch plate 3 so that the radially outermost portion of the diaphragm spring ceases to urge the pressure plate 25 against the adjacent friction linings 30 of the clutch plate. FIG. 1 shows the diaphragm spring 23 in a position which the diaphragm spring assumes when the clutch 2 is engaged. The diaphragm spring 23 assumes such position when it is permitted to dissipate a certain amount of energy.

The aforementioned frustoconical or funnel-shaped connecting portion 13 between the sections 6 and 14 of the mandrel 4 includes a centering portion 27 which is disposed in the central opening 28 of the diaphragm spring 23 and is immediately adjacent the radially innermost portions of the prongs 22. The centering portion 27 constitutes the maximum-diameter end of the connecting portion 13. The illustrated frustoconical centering portion 27 can be replaced with a cylindrical portion which is received in the opening 28 of the diaphragm spring 23.

It is further possible to provide the left-hand side of the washer-like portion of the section 14 with axially and radially extending projections 29 in the form of lugs (one shown in FIG. 1 by phantom lines) which extend into radially extending slots 30a alternating with the prongs 22 of the diaphragm spring 23. The centering means including the lugs 29 can be used in addition to or in lieu of the frustoconical centering portion 27 or in addition to or in lieu of the aforediscussed cylindrical centering portion of the connecting portion 13. If the centering means includes lugs 29, it is preferred to provide the section 14 with at least three preferably equidistant lugs.

The friction linings 30 of the clutch plate 3 are provided at both sides of the radially outermost portion of a disc-shaped carrier 31 which is non-rotatably affixed to a second disc-shaped carrier 32 by a set of rivets 33 or analogous distancing elements. The space between the carriers 31, 32 receives a flange 34 which is integral with or is non-rotatably affixed to the hub 7 of the clutch plate 3. The flange 34 and the carriers 31, 32 have registering windows for energy storing elements in the form of coil springs 35 (one shown in FIG. 1) which extend substantially tangentially of the clutch plate 3 and form part of an elastic damper. The carriers 31, 32 constitute the input element and the flange 34 constitutes the output element of such damper. A second damper in the form of a friction generating device 36 operates between the flange 34 and the carrier 31 and/or 32. The exact design of such dampers forms no part of the present invention. Reference may be had to numerous United States and foreign patents and patent applications of the assignee of the present application.

In order to prevent any, or any appreciable, axial stray movements of the mandrel 4, clutch 2 and clutch plate 3 relative to each other, the axial distance of the left-hand side of the radially outwardly extending portion of section 14 (such radially outwardly extending portion overlies and abuts the tips of the prongs 22) from the profiles 18 of the tongues 16 on the section 11 is selected in such a way that the profiles 18 abut the profile of the end portion 19 of the hub 7 when the tips of the prongs 22 abut the section 14. This also reduces the likelihood of radial stray movements of the mandrel 4, clutch plate 3 and clutch 2 relative to each other. The likelihood of radial stray movements is further reduced by the centering portion 27 which cooperates with the prongs 22, and by the internal gear 9 which surrounds the section 6 of the mandrel 4 with minimal clearance.

The kit 1 of FIG. 1 is assembled as follows:

The section 11 of the mandrel 4 is caused to pass first through the central opening 28 of the diaphragm spring 23 and thereupon through the axial passage 8 of the hub 7 so that it advances beyond the clutch plate 3 and is ready for insertion into a recess 37a. When the protuberances 17 of the tongues 16 reach the right-hand axial end of the hub 7, they are forced to move radially inwardly due to resiliency of the tongues 16, and the protuberances 17 move radially outwardly to place their profiles 18 adjacent the profile of the end portion 19 as soon as they emerge from the passage 8. The resilient tongues 16 then cooperate with the tips of the prongs 22 to hold the clutch plate 3 and the clutch 2 in predetermined axial positions relative to each other. In addition, the protuberances 17 cooperate with the section 14 to hold the mandrel 4 against accidental axial movement relative to the clutch 2 and clutch plate 3.

The kit 1 is converted into a friction clutch assembly in a manner as shown in FIG. 2. The recess 37a at the adjacent end of the output element (crankshaft) 38 of the engine receives a pilot bearing 37 (e.g., a needle bearing) which normally serves to receive one end of the input element of the variable-speed transmission forming part of the power train in a motor vehicle. The section 11 of the mandrel 4 is dimensioned in such a way that it can extend into the bearing 37. When the section 11 is received in the pilot bearing 37 (i.e., in the axial recess 37a of the output element 38), the clutch plate 3 on the mandrel 4 is properly centered with reference to the pressure plate or torque transmitting component (flywheel) 5. In other words, the axis of the clutch plate 3 then coincides with the axis 39 of the output element 38.

In the next step, an attendant or a robot affixes the marginal portion 41 of the cover 24 to the adjacent portion of the flywheel 5 by means of bolts 40. The flywheel 5 carries a customary starter gear and is provided with customary axially parallel centering pins (not specifically shown) which extend into complementary sockets (e.g., bores or holes) of the cover 24 in order to ensure that the clutch 2 is properly centered on the flywheel 5 preparatory to application of the bolts 40. The centering sockets are or can be provided in the marginal portion 41 of the cover 24.

The mandrel 4 is thereupon extracted from the needle bearing 37, hub 7 of the clutch plate 3 and central opening 28 of the diaphragm spring 23. Such extraction merely involves the application of an axial force to the section 14 in a direction to pull the mandrel 4 away from the flywheel 5. The force should suffice to ensure that the tongues 16 of the section 6 yield by permitting their protuberances 17 to move radially inwardly so that the protuberances can slide along the internal gear 9 of the hub 7 on their way toward the central opening 28 of the diaphragm spring 23. Radially inward depression of the protuberances 17 is facilitated by the composite frustoconical profile including the profiles 18 of the protuberances. The extracted mandrel 4 can be returned to the manufacturer of friction clutches for use in a freshly assembled kit.

The needle bearing 37 is necessary when the input element of the variable-speed transmission is dimensioned in such a way that it extends into the recess 37a of the output element 38. If the input element of the transmission is mounted in cantilever fashion, i.e., so that it is journalled only in the transmission and in the clutch plate 3, the bearing 37 can be omitted and the section 11 of the mandrel 4 is then dimensioned in such a way that it is snugly receivable in the recess 37a. Alternatively, the diameter of the internal surface bounding the recess 37a can be reduced so that the diameter of the section 11 can remain unchanged.

An advantage of the kit 1 is that the clutch 2 and clutch plate 3 can be properly assembled with each other right in the clutch making plant. The kit 1 can be delivered to an automobile assembly plant or to another establishment where the clutches are fully assembled. This saves space for storage and transport because the clutch and the clutch plate need not be wrapped and shiped separately. Moreover, when the kit 1 reaches the assembly plant, its clutch and clutch plate can be conveyed to the locus of installation in a motor vehicle or the like as a unit, i.e., it is not necessary to employ discrete pallets for the clutches 2 and clutch plates 3. This saves space and simplifies the delivery of component parts of clutches to the locus of installation in motor vehicles. In addition, it is much less likely that a clutch will be assembled with a wrong clutch plate if the kits 1 are assembled in the clutch making factory rather than if the clutches and clutch plates are assembled in the plant where the clutches are installed in motor vehicles.

The mandrel 4 not only ensures that the clutch 2 and the clutch plate 3 can be properly assembled with each other in the clutch making factory but this mandrel further serves as a means for facilitating attachment of the cover 24 of the clutch 2 to the flywheel 5 after the flywheel is properly secured to the output element 38 of the engine. The mandrel 4 renders it possible to dispense with standard centering tools which must be used if the clutches and clutch plates are to be affixed to flywheels in accordance with heretofore prevailing methods. In addition, the mandrel 4 simplifies, speeds up and reduces the cost and enhances the accuracy of the mounting of clutches in motor vehicles.

Figure 3:
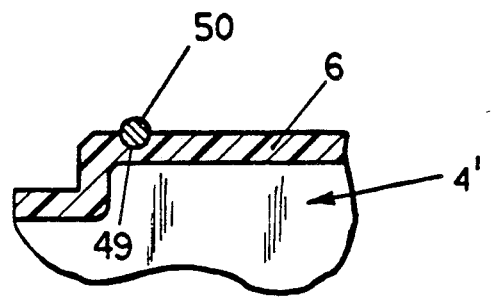
FIG. 3 is a fragmentary axial sectional view of a mandrel and of modified means for separably coupling the clutch and the clutch to the mandrel.

FIG. 3 shows a portion of a modified mandrel 4' wherein the section 6 is provided with a circumferential groove 49 for a portion of a radially deformable ring 50 which replaces the tongues 16 of the mandrel 4 shown in FIGS. 1 and 2. The ring 50 is made of rubber or a suitable elastomeric plastic material. This ring is deformed during introduction of the section 6 into the hub 7 of the clutch plate 3 and is thereupon permitted to expand in order to cooperate with the profile on the end portion 19 of the hub in order to prevent accidental extraction of the mandrel 4 from the clutch plate 3 and clutch 2. If desired, the ring 50 can be installed in an internal groove of the hub 7 so that it holds the mandrel 4 in a selected axial position relative to the clutch plate 3 exclusively by friction. All that is necessary is to properly select the deformability and the inner diameter of such ring. A conventional O-ring of the type used as a sealing element can be employed with the mandrel 4'.

Figure 4:
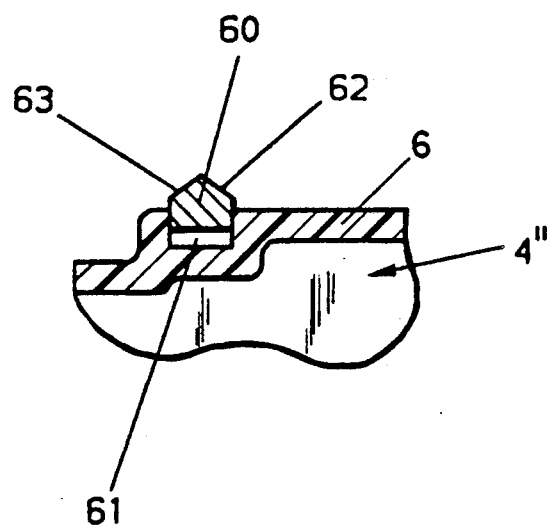
FIG. 4 illustrates a modification of the structure which is shown in FIG. 3.

FIG. 4 shows a further mandrel 4" wherein the section 6 is provided with a circumferential groove 61 for a split ring 60 of resilient material, e.g., spring steel. The ring 60 has a profile 62 which cooperates with the profile on the end portion 19 of the hub 7 when the mandrel 4" of FIG. 4 is used in lieu of the mandrel 4 of FIG. 1, and the ring 61 is further provided with a cam 63 which performs the function of the cam 20 of FIG. 1. The ring 60 tends to expand so that its outer diameter suffices to maintain the profile 62 in engagement with the profile on the end portion 19 of the hub 7 as soon as the ring 60 emerges from the passage 8. FIG. 4 shows the ring 60 in a radially expanded position in which at least a portion of the internal surface of the ring is spaced apart from the bottom surface in the groove 61 of the section 6. This ring can be replaced with an undulate ring which is provided with radially outwardly extending hills alternating with radially inwardly extending valleys. Such undulate ring can have a circular cross-sectional outline and its hills yield radially inwardly in response to engagement with the hub 7 to thereupon move radially outwardly due to innate resiliency of the ring and to cooperate with the profile of the end portion or detent element 19 in maintaining the mandrel, the clutch plate and the clutch in predetermined axial positions relative to each other. The undulate ring can be made of metallic or plastic wire.

The detent means of FIG. 1, 3 or 4 can be replaced with other types of detent means without departing from the spirit of the invention. For example, the mandrel 4 and the clutch plate 3 can be provided with means for positively but releasably locking the hub 7 to the section 6, and such locking means is deactivated prior to extraction of the section 11 from the recess 37a of the output element 38 preparatory to extraction of the mandrel from the clutch plate 3 and clutch 2 (such extraction follows attachment of the cover 24 to the flywheel 5 by means of the fasteners 40). The illustrated detent means including the tongues 16 and the end portion 19 of the hub 7 is preferred at this time because it automatically holds the clutch plate 3 and the clutch 2 in desired axial positions as soon as the section 14 abuts the tips of the prongs 22 and the protuberances 17 are free to move radially outwardly so as to move their profiles 18 adjacent the profile of the end portion 19. It can be said that the illustrated detent means operates with snap action, i.e., the resiliency of the tongues 16 suffices to render the detent means operative as soon as the mandrel 4 is properly inserted into the clutch 2 and clutch plate 3. Moreover, it is not necessary to actually unlock the mandrel 4 from the parts 2 and 3; all that is necessary is to exert a force which suffices to enable the end portion 19 of the hub 7 to depress the protuberances 17 radially inwardly so that they can begin to slide along the top lands of teeth forming part of the internal gear 9.

The clutch 2 which is shown in FIGS. 1 and 2 constitutes but one of several types of clutches which can be assembled with clutch plates in order to facilitate manipulation of the resulting kits during storage, transport and delivery to the locus of installation. For example, the cover 24 of a clutch can be designed to be directly secured to the output element (such as 38) of an engine. The axially movable pressure plate 25 and such cover flank a diaphragm spring. The radially outermost portion of the diaphragm spring reacts against the cover, and the radially inner or innermost portion of such diaphragm spring bears against the axially movable pressure plate. The cover carries a second pressure plate which rotates with and is disposed at a fixed axial distance from the cover. The clutch plate is installed between the two pressure plates. The mandrel which is used in conjunction with a modified clutch of the just outlined character serves to form a kit including the clutch plate and the second pressure plate. The kit is then affixed to the cover on the output element of the engine before the mandrel is extracted from the clutch plate and from the second pressure plate. Such mandrel need not include the section 11. If a section 11 is provided, it can extend axially through an aperture in a pressure plate which is affixed to the prongs of the diaphragm spring. In all or in many other respects, the mandrel which is used with the just described modified clutch is or can be identical with the mandrel which is shown in FIGS. 1-2, in FIG. 3 or in FIG. 4.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A kit, particularly for attachment to a rotary torque transmitting component which is driven by an output component of an engine in a motor vehicle and wherein one of the components has an axial recess, comprising a clutch including a rotary cover connectable to the rotary component, a rotary pressure plate adjacent said cover and disposed between the rotary component and the cover when the latter is connected to the rotary component, and means for biasing said pressure plate axially and away from said cover; a clutch plate; and means for temporarily securing said clutch to said clutch plate for joint attachment to the rotary component, including a mandrel having a first section in said clutch plate and a second section coaxial with said first section and extending beyond said clutch plate in a direction away from said pressure plate and receivable in the recess of the one component, and means for separably coupling said mandrel to said clutch and said clutch plate.

2. The kit of claim 1 for attachment to a rotary torque transmitting component which includes a flywheel, wherein said biasing means includes a diaphragm spring which reacts against said cover and bears against said pressure plate so as to urge the clutch plate axially against the rotary component when the latter is connected with said cover.

3. The kit of claim 1, wherein said clutch plate has a hub which surrounds said first section substantially without radial play.

4. The kit of claim 3, wherein said hub has an internal gear closely surrounding said first section.

5. The kit of claim 1, wherein said sections have cylindrical peripheral surfaces and the diameter of the peripheral surface of said second section is smaller than the diameter of the peripheral surface of said first section.

6. The kit of claim 1, wherein said mandrel includes a third section forming part of said coupling means and engaging said clutch, said first section being disposed between said second and third sections.

7. The kit of claim 6, wherein said third section extends radially outwardly beyond said first section and overlaps a portion of said clutch.

8. The kit of claim 7, wherein said third section is dished.

9. The kit of claim 7, wherein said biasing means comprises a diaphragm spring having an annulus of deformable prongs, said portion of said clutch including said prongs.

10. The kit of claim 1, wherein said coupling means includes means for yieldably holding said clutch plate and said clutch in predetermined axial positions relative to each other.

11. The kit of claim 10, wherein at least a portion of said holding means is disposed in the region of the first section of said mandrel.

12. The kit of claim 10, wherein at least a portion of said holding means is resilient.

13. The kit of claim 10, wherein said holding means includes means for automatically holding said clutch plate and said clutch in said predetermined positions as soon as said clutch and said clutch plate assume, and as long as said clutch and said clutch plate remain in, said predetermined positions.

14. The kit of claim 10, wherein said holding means comprises detent means operative to permit separation of said clutch plate from said mandrel in response to a pull upon at least one the parts including said clutch plate and said mandrel in a direction to move said clutch and said clutch plate axially and away from each other.

15. The kit of claim 10, wherein said clutch plate has a hub which surrounds said first section and said holding means includes detent means on said mandrel and on said hub.

16. The kit of claim 10, wherein said holding means includes at least one resilient first detent element provided on and movable radially of said mandrel, and a second detent element on said clutch plate.

17. The kit of claim 16, wherein said first and second detent elements have complementary first and second profiles which are adjacent each other in said predetermined axial positions of said clutch and said clutch plate.

18. The kit of claim 17, wherein said first detent element has a protuberance extending substantially radially of said mandrel and said first profile is provided on said protuberance.

19. The kit of claim 18, wherein said first detent element is provided on said first section and said clutch plate is disposed between said clutch and said protuberance, said clutch plate including a hub which surrounds said first section and said second detent element being provided on said hub.

20. The kit of claim 16, wherein said first detent element is integral with said first section.

21. The kit of claim 16, wherein said first detent element has a cam face to facilitate its passage through said annular clutch plate.

22. The kit of claim 10, wherein said mandrel has a peripheral groove and said holding means includes a radially deformable ring in said groove.

23. The kit of claim 22, wherein said ring is a resilient split ring.

24. The kit of claim 22, wherein said ring consists of an elastomeric material.

25. The kit of claim 1, wherein said mandrel has means for centering said clutch.

26. The kit of claim 25, wherein said centering means is surrounded by a portion of said clutch.

27. The kit of claim 25, wherein said biasing means comprises a diaphragm spring having prongs defining a central opening for said centering means.

28. The kit of claim 27, wherein said mandrel includes a third section adjacent and extending radially outwardly from said centering means and abutting said prongs.

29. The kit of claim 1, wherein said biasing means comprises a diaphragm spring having prongs defining a central opening, said mandrel further comprising connecting means in said opening and said coupling means comprising a third section forming part of said mandrel and adjacent said prongs, said connecting means being disposed between said first and third sections and said first section being disposed between said connecting means and said second section in the axial direction of said mandrel.

30. The kit of claim 29, wherein said connecting portion includes a cone which tapers from said third section toward said second section and includes means for centering said clutch on said mandrel, said centering means being adjacent said third section.

31. The kit of claim 1, wherein said mandrel is hollow and is arranged to receive a portion of a second kit so that such kits can be stacked.

32. The kit of claim 1, wherein said mandrel is hollow and said coupling means includes a portion of said mandrel which is integral with said first and second sections.

33. A friction clutch assembly, particularly for use in motor vehicles, comprising coaxial first and second rotary pressure plates; an annular clutch plate between said pressure plates; means for yieldably biasing one of said pressure plates toward the other of said pressure plates to thereby clamp said clutch plate between said pressure plates; fastener means applicable to said pressure plates to transmit torque therebetween; and means for temporarily securing said first pressure plate to said clutch plate to facilitate joint positioning of said clutch plate and said first pressure plate relative to said second pressure plate preparatory to the application of said fastener means, including a mandrel having a section surrounded by said clutch plate, and means for separably coupling said clutch plate and said first pressure plate to said mandrel so that the clutch plate and the first pressure plate are at least substantially coaxial with each other and are disposed in predetermined axial positions relative to one another.

34. The clutch assembly of claim 33, further comprising means for attaching said second pressure plate to an output element of an engine in a motor vehicle.

35. The clutch assembly of claim 33 for use in motor vehicle having an engine with an output element having an axial recess and being arranged to rotate said second pressure plate, said mandrel further having a second section coaxial with said first named section and receivable in said axial recess during application of said fastener means.

36. The clutch assembly of claim 35, further comprising a pilot bearing for said second section in said recess.

* * * * *